Sept. 9, 1958     J. E. PRESS ET AL     2,850,766

INJECTION MOLD ASSEMBLY

Filed April 25, 1956     4 Sheets-Sheet 1

INVENTORS
JOHN E. PRESS
HERBERT L. BENDEL
BY
ATTORNEYS

INVENTORS
JOHN E. PRESS
HERBERT L. BENDEL
BY
ATTORNEYS

Sept. 9, 1958  J. E. PRESS ET AL  2,850,766
INJECTION MOLD ASSEMBLY

Filed April 25, 1956  4 Sheets-Sheet 4

INVENTORS
JOHN E. PRESS
HERBERT L. BENDEL
BY
Smith, Olsen, Baird & Miller
ATTORNEYS United States Patent Office 2,850,766
Patented Sept. 9, 1958

2,850,766

INJECTION MOLD ASSEMBLY

John E. Press, Niles, and Herbert L. Bendel, Lincolnwood, Ill., assignors to Federal Tool Corporation, Chicago, Ill., a corporation of Illinois Application April 25, 1956, Serial No. 580,584

6 Claims. (Cl. 18—30)

This invention relates to injection molding machines and in particular to mold assemblies for use in injection molding machines.

Injection molding is used extensively in the fabrication of molded articles of thermoplastic material and involves essentially, heating a thermoplastic compound in a plasticizing cylinder to a viscous stage and then injecting the plastic material by means of a nozzle into the cavity of a relatively cool mold, wherein the plastic material is molded by the cavities into the shape of the fabricated article and quickly cooled to its solid state, after which the mold is opened and the fabricated article is ejected.

The molds generally used in the injection molding machines comprise two major parts: a stationary die block that is fastened to a stationary platen in the machine and in communication with an injection nozzle, and a movable die block that is fastened to a movable platen of the machine. The movable platen is alternately moved toward and away from the stationary platen in order to bring the die blocks, first to a closed position in order to define the mold space for receiving injected thermoplastic material, and then to an open position in order to permit the molded article to be removed from the mold.

It is normal that, in hardening, the viscous material tends to shrink slightly, and when elongated hollow bodies are molded in a mold space defined by a cavity and a core, the thermoplastic material has a slight tendency to shrink away from the cavity and to cling to the core. Hence, the core in an injection mold is generally made a part of the movable die block in order that the molded body may shrink onto the core and be withdrawn from the mold with the core die block.

It has been found, however, that this slight tendency of the thermoplastic material to shrink is not sufficient to permit free withdrawal of a molded object when the object has relatively thin walls of considerable area and is of a deep hollow configuration having very little wall draft. Such an object, for example, is the deep, thin walled single-piece body of the bread box shown in the design patent of Jean O. Reinecke, No. D-175,521, issued September 6, 1955. In molding objects of this kind injection pressures of several thousand pounds per square inch are employed and in some instances it is desirable that the injection pressure be on the order of 5000 pounds per square inch or higher. When such pressures are used, the relatively thin walls of the molded object, even when cooled, remain in forceful contact with both the surfaces of the core and with the interior walls of the cavity, thereby preventing withdrawal of the core and the molded object from the cavity. Furthermore, the shrinkage of the thermoplastic material is not always uniform and in the molding of deep elongated hollow bodies the molded body often tends to cling to both the cavity wall and the core wall so that the molded body fails to withdraw from the cavity with the core. In an automatic injection molding machine the failure of the molded body automatically to withdraw from the mold causes a serious interruption to the operational cycle of the machine, and when this failure occurs with frequency it results in a breakdown of the automatic nature of the machine oepration which detracts greatly from the speed of the molding operation and from the other advantages that may be realized from automatic machine operation.

It is a general object of this invention to provide an improved injection mold arrangement that overcomes the above described disadvantage.

A further object of the invention is to provide an improved injection mold arrangement and mode of operation therefor that substantially eliminates any clinging attraction between the walls of the molded body and the walls of the mold cavity during withdrawal of the molded body from the mold cavity.

Another object of the invention is to provide an improved injection mold for an elongated hollow body having a core section and a cavity section wherein the cavity section is separable into subsections for disengagement from the side walls of the molded body.

A further object of the invention is to provide an improved injection mold for molding elongated hollow bodies, having a core die block and a cavity die block, wherein the cavity die block is separable into sections along parting surfaces co-directional with the longitudinal axis thereof and wherein the sections are moved apart and together respectively with the opening and closing of the mold.

An additional object of the invention is to provide an improved injection mold having a core die block and a cavity die block mounted for movement between opened and closed positions in a horizontal direction wherein the cavity die block is separable along a substantially horizontal parting surface and wherein the lower section thereof is displaced in a horizontal direction and in a vertical downward direction away from the upper section when the mold is opened and wherein the lower section is joined with the upper section when the mold is closed.

An additional object of the invention is to provide an improved injection mold arrangement for molding elongated hollow bodies wherein the mold comprises a core die block supported on a movable platen for movement in a horizontal direction, and a cavity die block separable into an upper section and a lower section, the former of which is mounted upon a stationary platen and the latter of which is suspended, when the mold is opened, in spaced apart relationship with respect to the upper section and is supported, when the mold is closed, in contiguous relationship with respect to the upper section by cooperating camming surfaces provided on the core die block, on the lower section of the cavity die block, and on the stationary platen.

Yet another object of the invention is to provide an injection mold assembly of the kind just stated wherein the upper and lower sections of the cavity die block are provided with mating surfaces that are forcefully engaged when the mold assembly is in its closed condition and wherein the central portion of the area of one of the mating surfaces is slightly crowned with respect to the other, so that the force of one mating surface against the other will be greater at this central portion than elsewhere when the mold assembly is closed and will tend to overcome any tendency for the two sections to be sprung apart by internal pressure within the mold cavity during the molding operation.

Further features of the invention pertain to the structural arrangements utilized in attaining the above-outlined and other features of the invention.

The invention, both as to its structure and mode of operation, together with further objects and features thereof, will be best understood by reference to the following specification taken with the accompanying drawings wherein.

Figure 5:
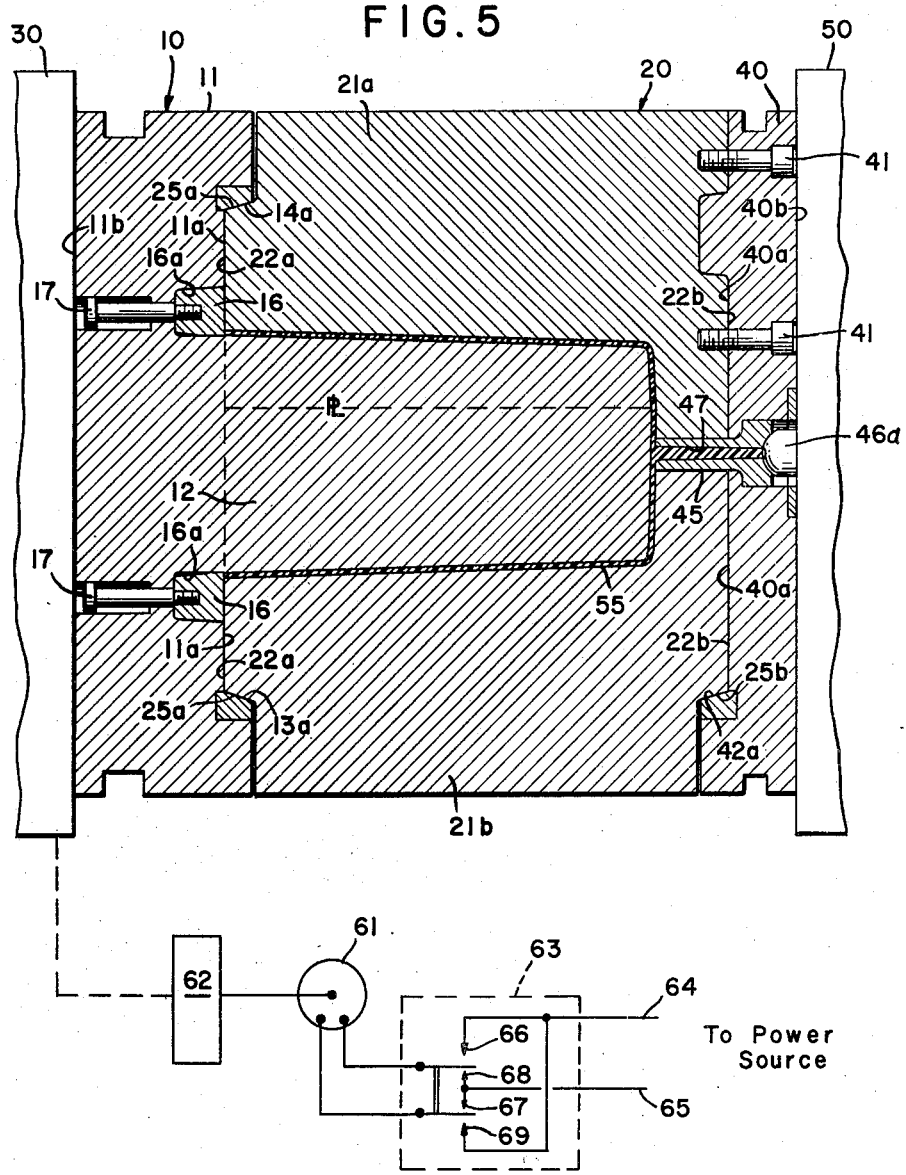
Figure 6:
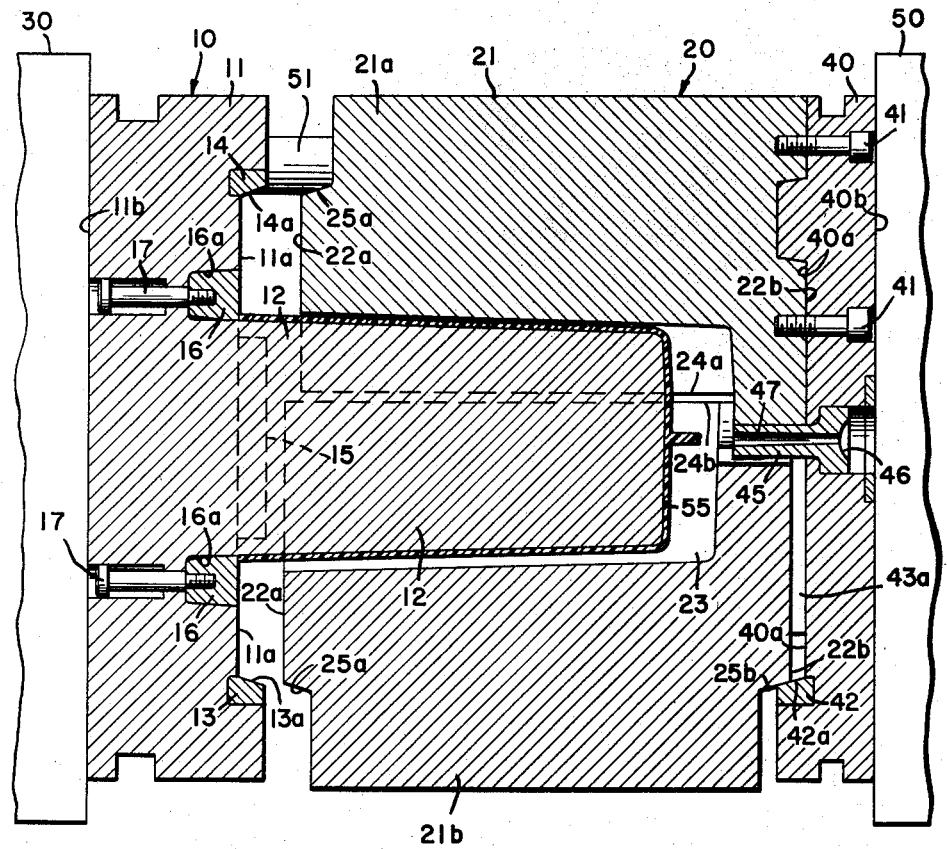

Fig. 5 is a vertical longitudinal cross-sectional view of the mold assembly in its closed position, taken on a slightly enlarged scale, and also showing schematically and in block form a mold assembly drive of the molding machine and a controller therefor; and Fig. 6 is a view like Fig. 5 but showing the mold assembly in a partially opened condition, the schematic showing of the mold assembly drive and the controller being eliminated in this view.

The injection mold of the invention, as illustrated in the drawings, comprises a core die block 10 and a cavity die block assembly 20, the former of which is mounted in any suitable manner directly upon a movable platen 30 of an injection molding machine, and the latter of which is mounted on a stationary platen 50 of the machine by means of a mounting shoe 40 which, in the present description, is considered to be a part of the cavity die block assembly. Conventionally, the stationary platen 50 is secured in any suitable fashion to the frame of the molding machine and the movable platen 30 is carried on the machine frame by a carriage for reversible movement in a horizontal direction between an open position and a close position. This conventional arrangement is adopted in the present embodiment of the invention so that the core die block 10 is moved in a horizontal direction between opened and closed positions with respect to the cavity die block assembly 20.

Figure 3:
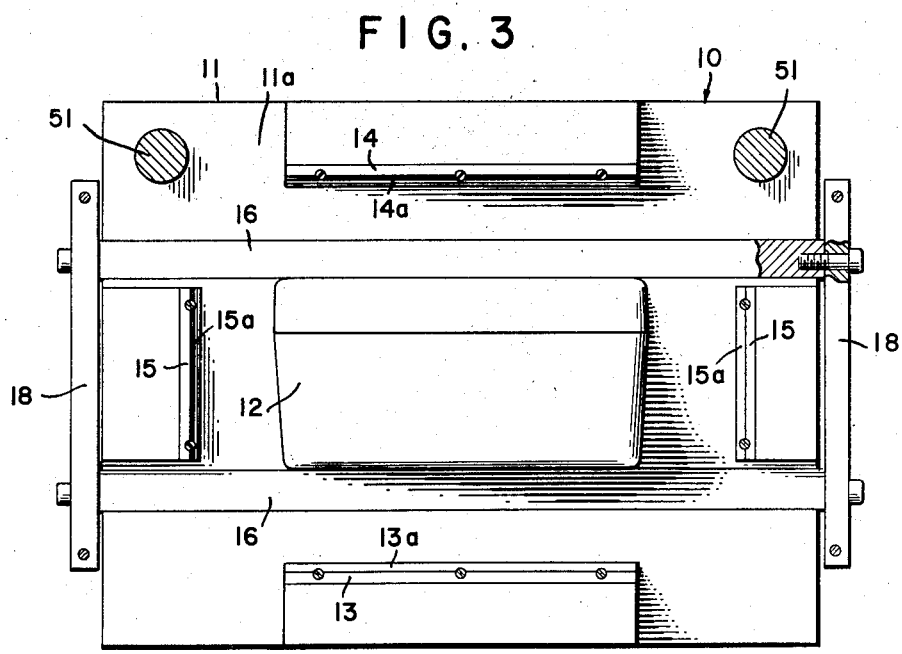
Fig. 3 is an elevational view of the front end of the core die block of the mold assembly, as viewed in the direction of the arrows 3—3 in Fig. 2.
Figure 4:
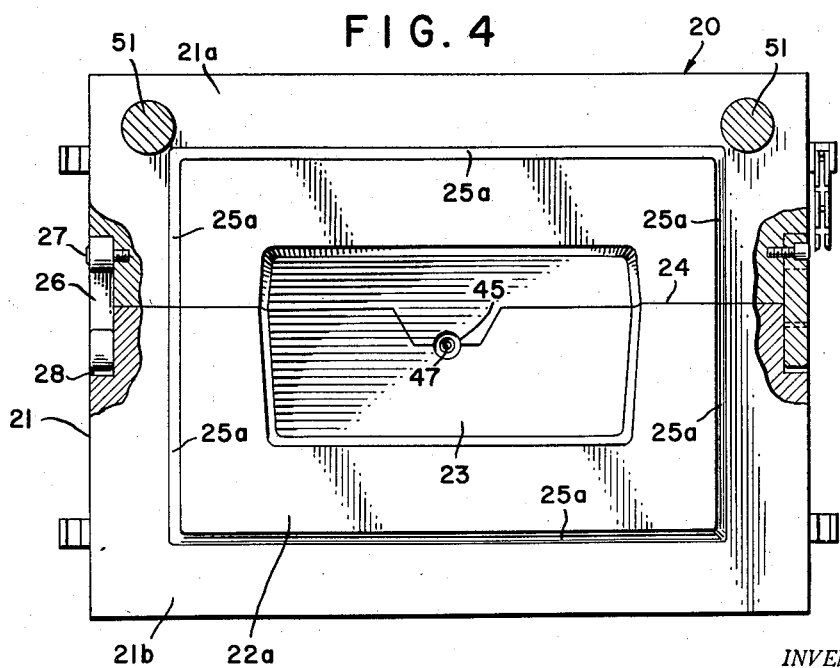
Fig. 4 is an elevational view of the open end of the cavity die block of the mold assembly showing its parts in closed position, with a portion thereof cut away along the line 4—4 of Fig. 1 to show, in vertical cross section, the structural features of a linkage arrangement for supporting the lower section of the cavity die block when the mold assembly is open.

The core die block 10, as best seen in Figs. 3, 5 and 6, comprises a die plate 11 having a platen face 11b on its back side, at which face the core die block 10 is mounted to the movable platen, and on its forward side the die plate 11 is provided with a joining face 11a having a forwardly projecting core member 12 formed thereon. The cavity die block assembly 20, as best illustrated in Figs. 4 and 5, comprises a two-part mold block 21 and the mounting shoe 40. This mounting shoe has a platen face 40b on the rear thereof, at which face the cavity die block assembly 20 is mounted to the stationary platen 50, and on its forward side the shoe is provided with a mold block face 40a. The two-part mold block 21 has a mounting shoe face 22b on the rear thereof in contact with the mold block face 40a of the mounting shoe 40, and an oppositely disposed joining face 22a. Additionally, the cavity die block 20 has a cavity 23 extending inwardly from the joining face 22a and a sprue bushing 45 extending inwardly from the platen face 40b of the mold shoe 40 to the cavity 23. The sprue bushing 45 has therein a nozzle seat 46 for receiving the molding material injection nozzle 46a (shown only in Fig. 5), which projects from the stationary platen and is a part of the plasticizing cylinder assembly of the injection molding machine, and a sprue channel 47 communicating between the nozzle seat 46 and the interior of the cavity 23. Thus, in the closed position the core die block 10 and the cavity die block 20 are joined at the joining faces 11a and 22a to define a mold space between the core member 12 and the cavity 23 which is accessible from the injection nozzle by means of the sprue channel 47. In the closed position plastic material is injected into the mold space of the mold wherein it is cooled and a molded body 55 is formed.

Referring again to the cavity die block assembly 20, the mold block 21 thereof, as illustrated in Figs. 4 and 6, is separable along a parting line 24 into an upper section 21a and a lower section 21b having, respectively, cooperating parting faces 24a and 24b. The upper section 21a is fixed to the mounting shoe 40 by mold block retaining screws 41 and includes the portion of sprue bushing 45 that extends into the mold block. The lower section 21b is supported by camming surfaces on the die plate 11 and on the mounting shoe 40 when the mold is closed, and when the mold is open it is suspended from the upper section 21a by keyed support tongues 26. Specifically, the die plate 11 has a forwardly projecting horizontally extending camming block 13 and a similar block 14 respectively provided on the joining face 11a below and above the core member 12, which blocks are provided with camming faces 13a and 14a, respectively. Additionally, the die plate 11 has a pair of camming blocks 15 vertically disposed on the joining face 11a on opposite sides of the core member 12, each of which is provided with a camming face 15a (Fig. 3). Similarly, the mounting shoe 40 has a forwardly projecting camming block 42 provided with a camming face 42a horizontally disposed along the mold block face 40a adjacent the lower boundary thereof, and a pair of camming block 43 each of which is provided with a camming face 43a vertically disposed on the mold block face 40a adjacent the side boundaries thereof. The mold block 21 has camming faces 25a on the outer boundary of the joining face 22a thereof which cooperate with the camming faces 13a, 14a and 15a of the die plate 11, and the lower section 21b thereof has camming faces 25b on the outer boundary of the mounting shoe face 22b which cooperate with the camming faces 42a and 43a of the mold shoe 40. When the core die block 10 and the cavity die block assembly 20 are in the closed position, the camming faces 13a, 14a, 15a, 25b and 42a cooperate essentially to establish a close fit between the die plate 11, the upper section 21a and the lower section 21b of the mold block 21 and the mounting shoe 40 so as to apply pressure to the sections of the mold against the injection pressure therein, thereby preventing flash edges on the molded body along the parting surface 24.

When the core die block and the cavity die block assembly are in the closed position, the camming blocks 13 and 42 support the lower section 21b of the mold block 21. On the other hand, when the core die block 10 is moved from the closed position toward its opened position with respect to the cavity die block assembly 20, the lower section 21b of the mold block 21 is caused by the forces of gravity operating thereon to ride on the camming face 13a of the die plate 11 and on the camming face 42a of the mounting shoe 40 in a horizontal direction away from the mold shoe 40 and in a vertical direction downwardly from the fixed upper section 21a of the mold block 21 so that the lower section 21b moves with the core die block 10 and is displaced from the mold block face 40a of the mounting shoe 40 and from the parting face 24a of the upper section 21a. This movement of the lower section 21b continues until support therefor is furnished from the upper section 21a by keyed support tongues 26.

Figure 1:
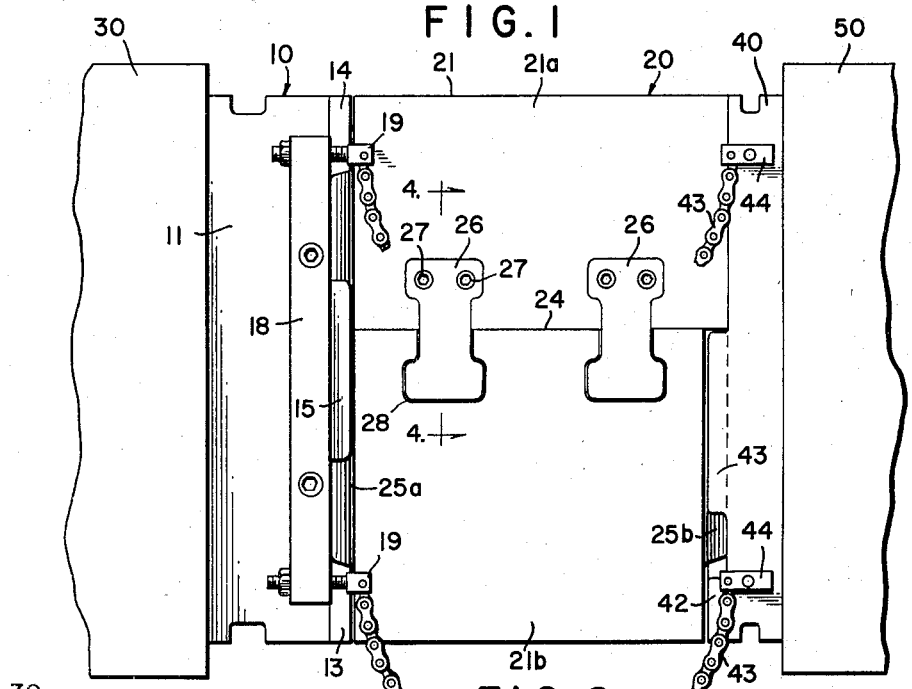
Fig. 1 is a side elevational view of the mold assembly in accordance with the invention in its closed condition.
Figure 2:
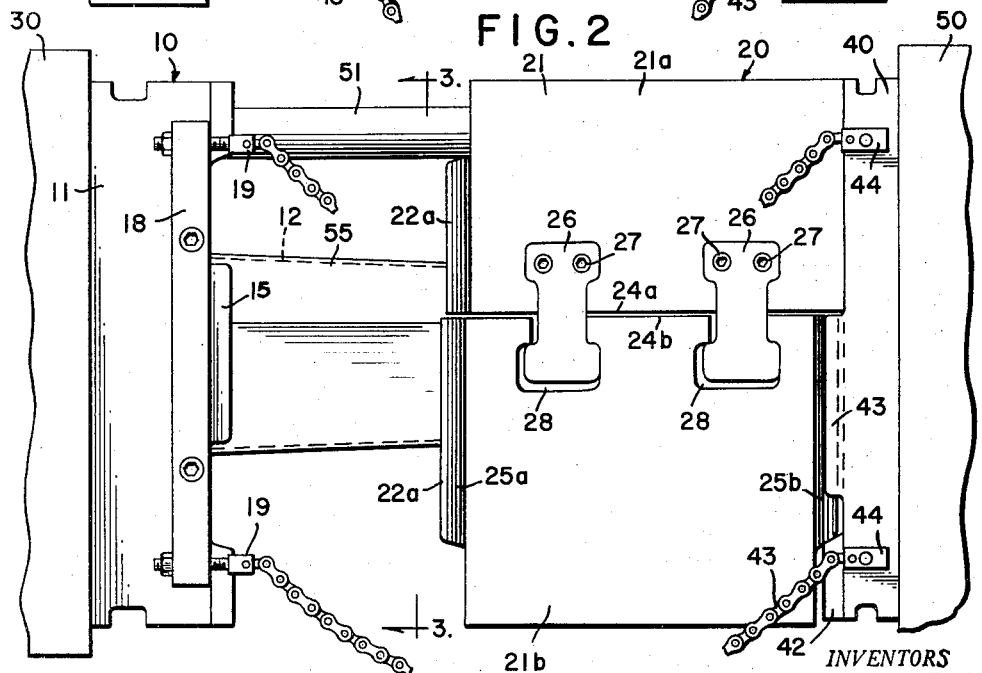
Fig. 2 is a side elevational view of the mold assembly in a partially opened condition.

Considering now the support furnished from the upper section 21a, two keyed support tongues 26 are recessed in each of the vertical sides of the upper section 21b of the mold block 21 and are secured thereto by support screws 27 to extend beyond the parting surface 24 of the mold block 21. The extended portions of the tongues 26 are fitted into keyed receiving slots 28 formed in the sides of the lower section 21b. As illustrated in Fig. 1, the shape of the keyed portion of each of the tongues 26 is substantially that of an inverted T and the shape of each of the receiving slots 28 is substantially the same, though slightly larger than the tongue 26 so that when the core die block 10 and cavity die block 20 are in the closed position the side walls of the tongue 26 are not in contact with the side walls of the receiving slot 28 and support for the lower section 21b is thus entirely from the die plate 11 and mounting shoe 40, as previously explained. However, when the core die block is moved from the closed position toward the opened position, the lower section 21b moves in a horizontal direction and downwardly in a vertical direction, as previously explained, until the side walls of the receiving slots 28 come into contact with the side walls of the tongues 26, at which time the movement of the lower section 21b is stopped, the lower section 21b of the mold block 21 being spaced apart from the upper section 21a and from the mold shoe 40, and the lower section 21b being supported essentially from the upper section 21a on the tongues 26 and also supported on the camming block 42 of the mold shoe 40, as shown in Fig. 2.

Referring now to the movement of the core die block 10 with respect to the cavity die block 20, the core die block 10 slides on a pair of tie bars 51 that are secured to the frame of the molding machine and extend through the stationary platen 50, the mounting shoe 40, the upper section 21a of the mold block 21, the die plate 11 and the movable platen 30. The movement of the movable platen 30, if desired, may be controlled as schematically shown in Fig. 5, by a controller that includes a reversible motor 61 coupled to the movable platen 30 by means of a transmission 62 of any suitable type, and which is energized through a two pole double-throw switch 63 from a power source over conductors 64 and 65. The conductors 64 and 65 in this arrangement are poled so that when the switch 63 is operated to its close position, closing a circuit at contacts 66 and 67, the motor 61 is operated to move the platen 30 toward its close position and when the switch 63 is operated to its open position, closing a circuit at contacts 68 and 69, the motor 61 is operated to move the platen 30 toward its open position. Now assuming that the switch 63 and the movable platen 30 are in their close positions and the switch 63 is operated to its open position, the motor 61 operates to move the platen 30 toward its open position, causing the core die block 10 to be moved from its closed position with respect to the cavity die block assembly 20 toward its opened position. In moving from the closed position toward the opened position the core die block 10 withdraws the molded body from the cavity die block 20 on its core member 12 and extends itself to the opened position with respect to the cavity die block 20 to permit the molded body 55 to be ejected from the core member.

In order to eject the molded body 55, the die plate 11 is provided with a pair of knockout bars 16, which, as illustrated in Figs. 3 and 6, extend horizontally across the face of the die plate 11 contiguous with the juncture of the core member 12 and joining face 11a. The knockout bars 16 are normally seated in a pair of horizontally extending slots 16a in the die plate 11 and flush with the plate to form a part of the joining face 11a thereof, and they are retained in the die plate by movable retaining screws 17 which may be spring loaded in order to insure against premature displacement of the bars. The knockout bars 16 extend laterally at their opposite ends beyond the sides of the die plate 11 where they are joined by a pair of upstanding drag bars 18 that are secured at their upper and lower ends by bolts 19 to drag chains 43 that extend to and are secured to the shoe 40 by bolts 44. When the core die block 10 and cavity die block 20 are in the closed position the drag chains 43 hang slack. However, as the core die block moves to the opened position the slack is taken up until, at the opened position, tension in the drag chains 43 operates on the bars 18, causing the knockout bars 16 to extend beyond the surface of the joining face 11a and project against the lip of the molded body 55 carried on the core member 12. As the extending action of the knockout bars 16 is relatively abrupt, the molded body 55 experiences a force at the lip thereof sufficient to cause the molded body to be removed from the core member 12 and fall free of the core die block.

Considering now the molding operation, the core die block 10 and cavity die block assembly 20 are made of a high grade steel, and may have a hard chromium plating on the surfaces of either, or both, the cavity 23 and the core member 12. Additionally, the die blocks include channels, not shown, for circulating a coolant. The coolant maintains the mold relatively cool at all times so that hot viscous thermoplastic material injected into the mold is quickly cooled and solidified. When cooled and solidified the thermoplastic tends to shrink and to cling to the core member. However, this shrinkage is now always uniform or complete and some residual amount of frictional attraction is experienced between the outside wall of the molded body 55 and the cavity 23; so that with respect to a molded body, such as that illustrated, having little or no draft between the ends thereof, this frictional force is often sufficient to cause the molded body to be retained in the cavity die block after the core die block has been withdrawn. It is inclusive in the concept of this invention that not only should the core die block be removable from the cavity die block but at substantially the same time the cavity die block should be separable in order to overcome any frictional forces between the walls of the molded body and the walls of the mold cavity that might inhibit the withdrawal of the molded body on the core member. Thus, in the described embodiment the mold block 21 is separable into an upper section 21a and a lower section 21b, and simultaneously with the initial withdrawal movement of the core die block 10 from the mold block 21, the lower section 21b moves in a vertical direction to separate the walls of the portion of the cavity 23 therein from the side walls of the molded body 55, thereby eliminating any frictional forces therebetween, and at the same time moves in the horizontal direction with the core die block 10 and cooperates therewith in overcoming any frictional forces that may exist between the walls of the molded body 55 and the walls of the portion of the cavity 23 in the upper section 21a. Specifically, should the frictional forces between the outside wall of the molded body 55 and the wall of the portion of the cavity 23 in the upper section 21a be sufficient to cause the molded body to be loosened from the core member 12, the simultaneous movement of the lower section 21b in the horizontal direction causes the end wall of the cavity 23 therein to push against the end wall of the molded body 55 with sufficient force and with a sufficient stroke to overcome the frictional forces of the upper section 21a thereby causing the molded body 55 to release from the upper section 21a and to be carried on the core member 12 from the cavity. The releasing action of the lower section 21b so closely follows the withdrawal movement of the core die block 10 that during the withdrawal, the lip of the molded body 55, if not in contact with the face of the knockout bars 16, is at least in close proximity thereto so that in the opened position the extending stroke of the knockout bars 16 ejects the molded body 55 from the core member 12.

Assuming that the movable platen 30 has been withdrawn to its fully open position so that the drag chains 43 have caused the knockout bars 16 to displace a molded body 55 from the projecting core 12 of the core die block 10, it will be noted, as previously explained, that the lower section 21b of the cavity die block will have been displaced downwardly by gravity from the mating position that it occupies with respect to the upper section 21a of the cavity die block during the actual injection of thermoplastic material into the mold cavity. The lower section 21b of the cavity die block will be suspended beneath the upper section 21a thereof by the inverted T-shaped lugs 26 at opposite sides of the cavity mold assembly. After the molded body 55 has been removed from the core 12, the mold assembly is immediately in condition to be returned to its closed position for another molding operation. The switch 63 may thus be operated to energize the motor 61 to cause it to turn in a direction that will cause the transmission 62 to drive the movable platen 30 toward the stationary platen 50. During this movement the upper and lower horizontally extending camming surfaces 14a and 13a on the forward face of the core die block 10 (Fig. 3) will come into contact with their corresponding cam surfaces 25a that are formed upon the forward faces of the upper and lower sections 21a and 21b of the cavity die block. At the same time, the laterally disposed vertically extending camming surfaces 15a on the forward face of the core die block on opposite sides of the core 12 (Fig. 3) will come into sliding contact with the corresponding vertically extending camming surfaces 25a on the forward faces of the upper and lower sections of the cavity die block (Fig. 4). Continued movement of the movable platen 30 toward the stationary platen 50 will cause the horizontally extending camming surface 25b on the rear of the lower section 21b of the cavity die block to ride up onto the camming surface 42a of the cam member 42 that extends horizontally across the lower portion of the shoe 40. At the time the camming surface 25b rides up onto the stationary corresponding surface 42a, a pair of laterally disposed vertical extending camming surfaces 25b (Figs. 1 and 2) on the rear of the lower section 21b of the cavity die block (corresponding to the vertically extending camming surfaces 25a thereon shown in Fig. 4) also engage and ride against a pair of cooperating camming surfaces 43a extending vertically on the forward face of the mounting shoe 40 (Fig. 6).

Thus, it will be understood that as the movable platen 30 is advanced toward the stationary platen 50, the lower section 21b of the cavity die block is cammed both rearwardly and upwardly by the co-action of the camming surfaces 13a and 25a and by the corresponding co-action between the surfaces 42a and 25b at the forward and rear ends, respectively, of this lower section. This upwardly directed camming action forcefully brings the lower section 21b of the cavity die block into mating contact with the stationary upper section 21a thereof, the surface 24b on the top of the lower section being pressed forcefully and heavily against the corresponding lower surface 24a of the upper section 21a. At the same time the lower section 21b of the cavity die block is moved into its upper mating position with respect to the upper section of the die block, the vertically extending camming surfaces at the forward and rear ends of the lower section center and fix the position of the lower section laterally with respect to the upper section, thus insuring that the lower section is properly positioned with respect to the upper section preparatory to injection of the thermoplastic material into the molding cavity.

When the mold parts are in their closed condition, it will be noted that the several camming surfaces, in addition merely to supporting the lower section of the cavity die block, also serve to reinforce the upper and lower sections of the cavity die block to prevent separation thereof when the thermoplastic material is injected into the cavity under extreme pressure. The several camming surfaces, in this regard act as clamps that firmly secure the two cavity die block halves together.

In some instances where the two halves of the cavity die block are of substantial length, it is desirable to provide the mating surface 24b at the top of the lower section of the cavity die block with a slight crown. This crown should be only a few thousandths of an inch in height, depending upon the length of the cavity die block or the depth of the cavity therein. Such a crown would not, of course, be apparent in drawings of the scale used in the present figures, and the crown has accordingly been shown in greatly exaggerated form only in Fig. 6 of the present drawings. This crown serves to effect a preloading between the upper and lower sections of the cavity die block. Thus, when the crown is present, the forces between the upper and lower sections of the cavity die block are greater at the longitudinal center portion of the mating surfaces 24a and 24b so that the lower section 21b of the cavity die block is actually flexed slightly as the two portions of the cavity die block are brought forcefully into mating position, in which position the two mating surfaces 24a and 24b lie forcefully together throughout their entire areas. This preloading of the lower section 21b of the cavity die block tends to overcome any tendency of that section to flex downwardly under the extreme injection pressures employed and thus tends to prevent flashing of the thermoplastic material between the two cavity die block halves.

After the thermoplastic material has been injected into the cavity of the closed mold and has cooled sufficiently, the motor 61 is energized in its reverse direction to withdraw the movable platen 30 from the closed position shown in Fig. 1 toward its open position. It will be understood, as previously explained in some detail, that as the movable platen and the core die block are withdrawn, the lower section 21b of the cavity die block is immediately caused by gravity to ride downwardly on the cam surfaces 13a and 42a and also to be carried forwardly slightly on the surface 42a and, in some instances, by momentary friction between the inner surface of the cavity in the lower section 21b and the exterior surface of the molded body. As the lower section 21b moves or drops to its lower position (shown in Figs. 2 and 6), the inverted T-shaped lugs 26 that are fixed in depending position on the opposite sides of the upper section 21a of the cavity die block, contact the upper edges of the recesses 28 in the sides of the lower section 21b, thereby stopping the downward movement of this lower section and supporting the same until the mold assembly is again moved to its closed position.

In view of the foregoing, it is apparent that there has been provided an improved injection mold arrangement for molding elongated hollow bodies that substantially eliminates interruptions in the molding operation arising from the failure of the molded body to be withdrawn from the mold.

While there has been described what is at present a preferred embodiment of the invention, it is understood that various modifications may be made therein, and it is intended to cover in the appended claims all such modificaitons as fall within the true spirit and scope of the invention.

We claim:

1. An injection mold comprising, a cavity die block and a cooperating core die block relatively movable in a horizontal direction toward each other to a closed position and away from each other to an open position alternately to open and close a mold cavity in said cavity die block, said cavity die block having upper and lower mating sections separated by gravity when said blocks are moved toward said open position to facilitate removal of a molded body from the mold cavity, and cooperating camming surfaces on said core die block and on said lower section of said cavity die block for camming said lower seciton upwardly into forceful mating contact with said upper section when said core die block and said cavity die block are moved toward each other.

2. The combination set forth in claim 1, wherein said upper and lower sections of said cavity die block are provided with mating surfaces that are in intimate contact with each other when said blocks are in said closed position, one of said mating surfaces being slightly centrally crowned with respect to the other so that one of said sections is flexed during the movement of said blocks to said closed position, the flexure of said one section tending to prevent separation of said mating surfaces by internal pressure in the mold cavity when said blocks are in said closed position.

3. An injection mold comprising, a cavity die block and a cooperating core die block relatively movable in a horizontal direction toward each other to a closed position and away from each other to an open position alternately to open and close a mold cavity in said cavity die block, said cavity die block having upper and lower mating sections separated by gravity when said blocks are moved toward said open position to facilitate removal of a molded body from the mold cavity, said upper section being provided with a plurality of keyed tongue-like members projecting downwardly beyond the parting surface thereof, said lower section being provided with a plurality of keyed slots to receive said tongue-like members and for supporting said lower section thereon in movable relation with respect to said upper section, and cooperating camming surfaces on said core die block and on said lower section of said cavity die block for camming said lower section upwardly into forceful mating contact with said upper section when said core die block and said cavity die block are moved toward each other.

4. An injection mold as set forth in claim 3, wherein the core die block has associated therewith an ejection controller operable upon movement of the cavity die block and the core die block away from each other to strip a molded article from the core die block after the parting by gravity of the upper and lower mating sections of said cavity die block.

5. In an injection type molding machine for molding elongated hollow articles having a small wall draft, the combination comprising a stationary platen and a movable platen movable toward and away from said stationary platen in a horizontal direction, a core die block mounted on said movable platen and extending toward said stationary platen, a mounting shoe mounted on said stationary platen opposite said movable platen, an upper cavity die block section fixedly mounted on said shoe, a movable lower cavity die block section supported upon said upper section and cooperating therewith in one position thereof to provide a mold cavity, and cooperating camming surfaces mounted on said core die block and said upper section and said lower section and said mounting shoe cooperating upon movement of said movable platen toward said stationary platen to lift said lower section upwardly into tight mating contact with said upper section to provide a tight mold cavity receiving said core die block therein, movement of said movable platen away from said stationary platen releasing said lower section whereby said lower section falls away from said upper section under the influence of gravity to facilitate removal of a molded body from the mold cavity.

6. In an injection type molding machine for molding elongated hollow articles having a small wall draft, the combination comprising a stationary platen and a movable platen movable toward and away from said stationary platen in a horizontal direction, a core die block mounted on said movable platen and extending toward said stationary platen, a mounting shoe mounted on said stationary platen opposite said movable platen, an upper cavity die block section fixedly mounted on said shoe, a plurality of keyed tongue-like members mounted on said upper section and projecting downwardly therefrom past the parting surface thereof, a lower cavity die block section having a plurality of keyed slots formed therein for receiving said tongue-like members to support said lower section thereon in movable relation with respect to said upper section, said upper and lower sections cooperating in one position thereof to provide a mold cavity, and cooperating camming surfaces mounted on said core die block and said upper section and said lower section and said mounting shoe cooperating upon movement of said movable platen toward said stationary platen to lift said lower section upwardly into tight mating contact with said upper section to provide a tight mold cavity receiving said core die block therein, movement of said movable platen away from said stationary platen releasing said lower section whereby said lower section falls away from said upper section under the influence of gravity to facilitate removal of a molded body from the mold cavity.

References Cited in the file of this patent

UNITED STATES PATENTS

| | | |
|---|---|---|
| 2,292,593 | Amigo | Aug. 11, 1942 |
| 2,377,393 | Wiley | June 5, 1945 |